United States Patent
Itsumi et al.

Patent Number: 5,887,140
Date of Patent: Mar. 23, 1999

[54] COMPUTER NETWORK SYSTEM AND PERSONAL IDENTIFICATION SYSTEM ADAPTED FOR USE IN THE SAME

[75] Inventors: Kazuhiro Itsumi, Kawasaki; Satoshi Uchida; Harumi Nukui, both of Yokohama, all of Japan

[73] Assignee: Kabushiki Kaisha Toshiba, Kawasaki, Japan

[21] Appl. No.: 622,608

[22] Filed: Mar. 26, 1996

[30] Foreign Application Priority Data

Mar. 27, 1995 [JP] Japan .................................. 7-068185

[51] Int. Cl.⁶ .................................................. G06K 9/00
[52] U.S. Cl. ............................... 395/200.55; 395/187.01; 382/124; 382/125; 382/115; 340/825.34
[58] Field of Search ................... 395/187.01, 200.06, 395/200.11, 200.54, 200.55; 382/115, 124, 125, 126, 127; 340/825.3, 825.31, 825.34; 356/71

[56] References Cited

U.S. PATENT DOCUMENTS

| | | |
|---|---|---|
| 4,210,899 | 7/1980 | Swonger et al. .......................... 382/125 |
| 4,919,545 | 4/1990 | Yu ........................................ 395/187.01 |
| 4,995,086 | 2/1991 | Lilley et al. .............................. 382/124 |
| 5,054,089 | 10/1991 | Uchida et al. ........................... 382/127 |
| 5,055,658 | 10/1991 | Cockburn ................................ 382/124 |
| 5,105,467 | 4/1992 | Kim et al. ................................ 382/125 |
| 5,202,929 | 4/1993 | Lemelson ............................. 340/825.31 |
| 5,229,764 | 7/1993 | Matchett et al. ...................... 340/825.34 |
| 5,325,442 | 6/1994 | Knapp ...................................... 382/124 |
| 5,337,043 | 8/1994 | Gokcebay ............................ 340/825.31 |
| 5,408,536 | 4/1995 | Lemelson ................................ 382/115 |
| 5,420,936 | 5/1995 | Fitzpatrick et al. ..................... 382/124 |
| 5,493,621 | 2/1996 | Matsumura .............................. 382/125 |
| 5,496,506 | 3/1996 | Berson et al. ........................... 382/115 |
| 5,524,161 | 6/1996 | Omori et al. ............................ 382/125 |
| 5,546,471 | 8/1996 | Merjanian ............................... 382/124 |
| 5,548,721 | 8/1996 | Denslow ............................. 395/187.01 |
| 5,559,504 | 9/1996 | Isumi et al. .......................... 340/825.3 |
| 5,613,012 | 3/1997 | Hoffman et al. ........................ 382/115 |
| 5,615,277 | 3/1997 | Hoffman ................................. 382/115 |

OTHER PUBLICATIONS

"Finger Image Identification Method for Personal Verification", Proceedings 10th International Conference on Pattern Recognition, vol. 1; M. Takeda, et al., pp. 761–766, 1990.

Primary Examiner—Eric W. Stamber
Attorney, Agent, or Firm—Oblon, Spivak, McClelland, Maier & Neustadt, P.C.

[57] ABSTRACT

When a request to access a file or the like is made, a characteristic measuring unit measures the physical characteristic of a user of a computer system. A data degenerating unit processes the measured physical characteristic as degenerated characteristic data like a one-dimensional projection and outputs the degenerated characteristic data to the computer system. The computer system sends this characteristic data to an identification server via a communication network. The identification server performs an identification process in accordance with characteristic data preregistered in a file system. In accordance with the identification result, it is determined whether or not to approve the access authorization by the user and the permission or rejection of the access is sent back to the computer system via the communication network.

14 Claims, 10 Drawing Sheets

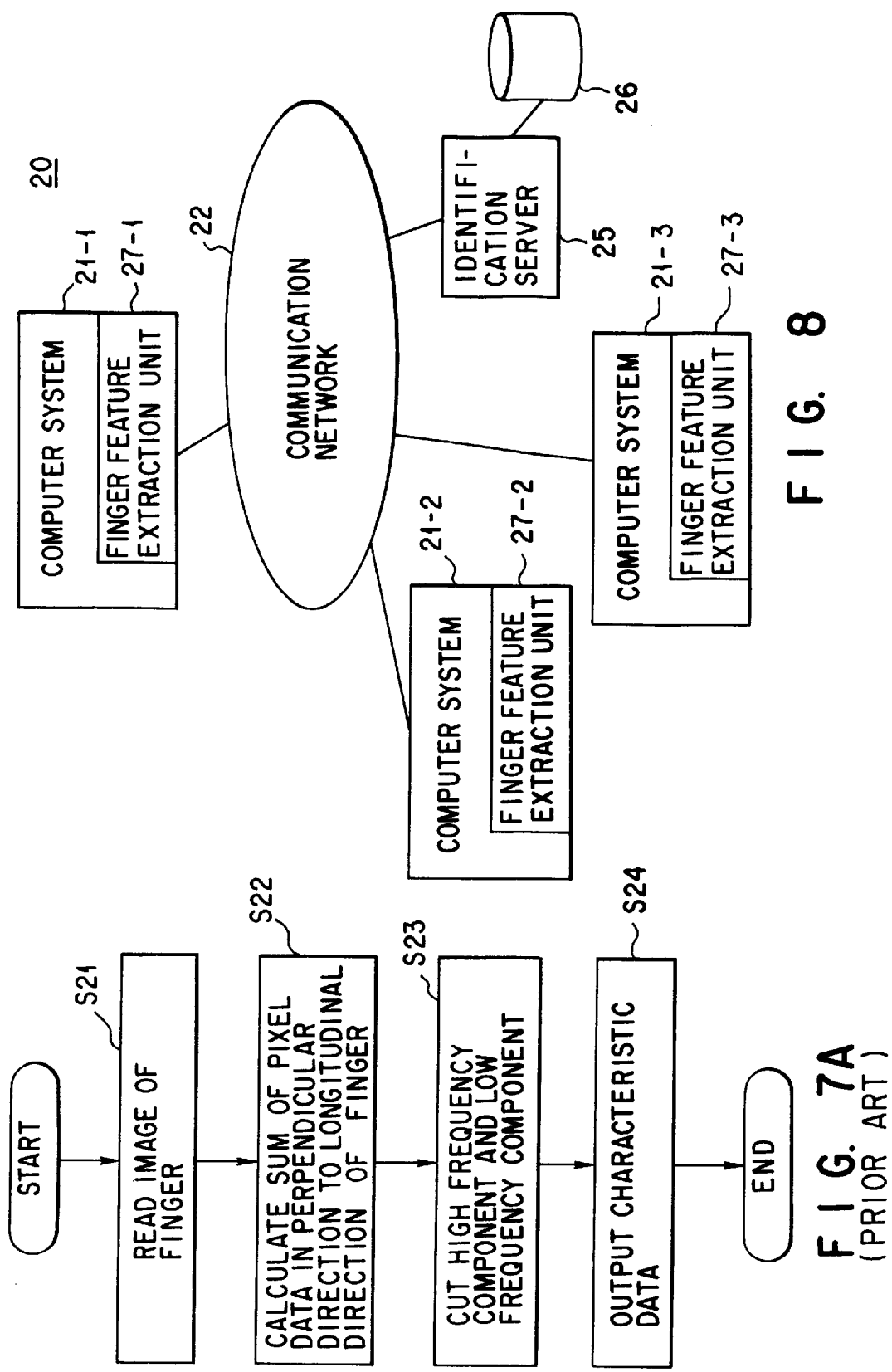

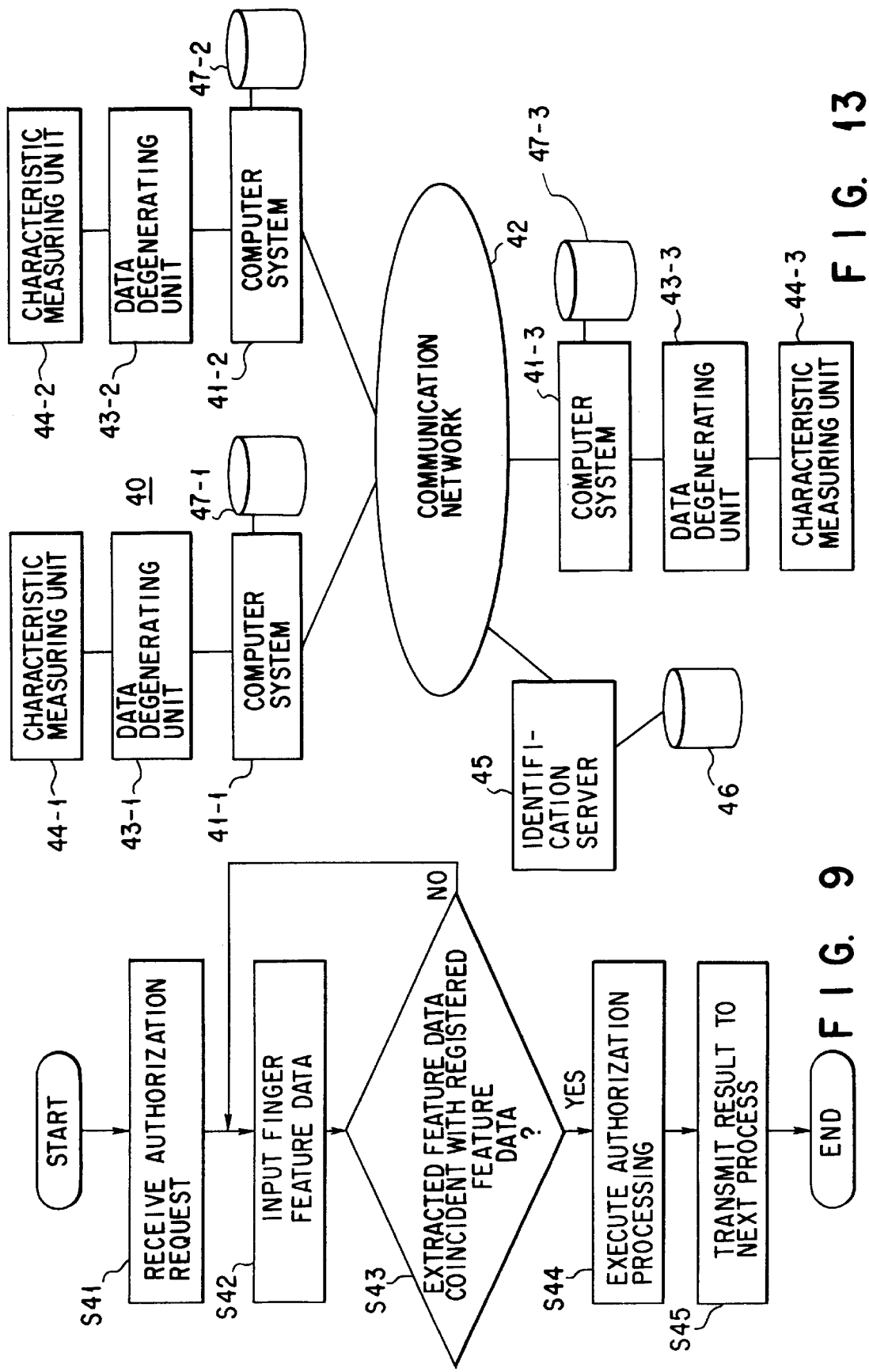

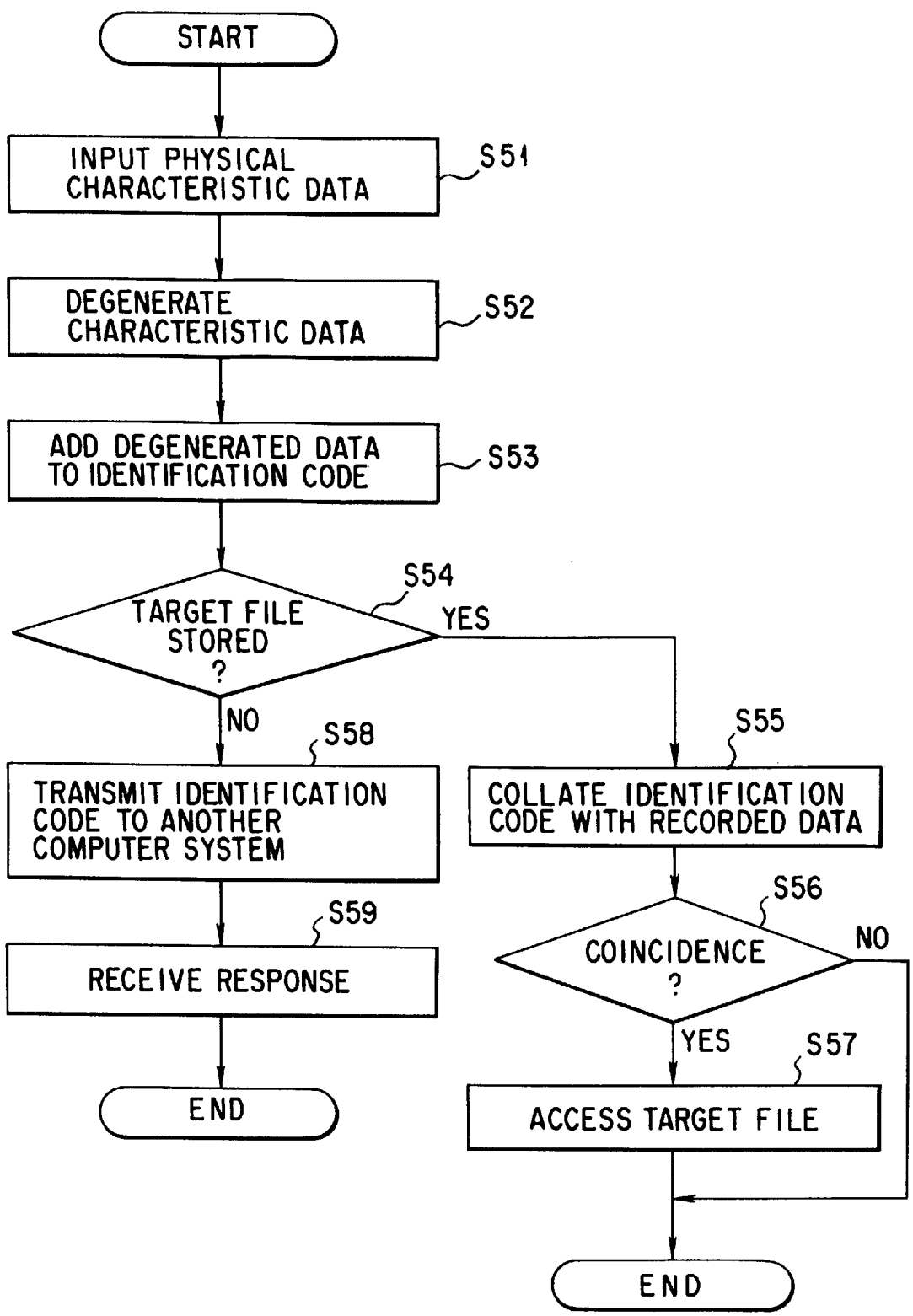
F I G. 11

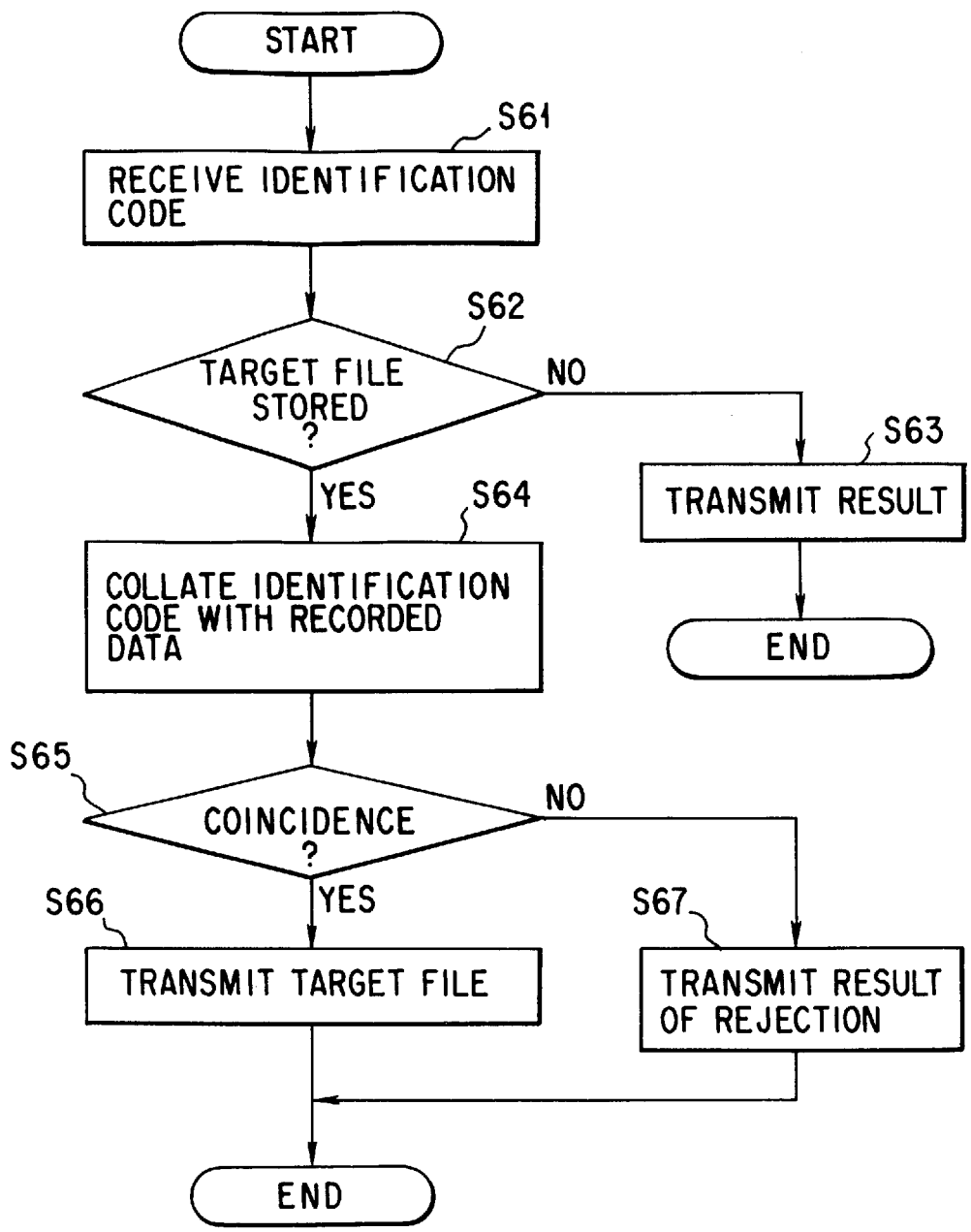
F I G. 12

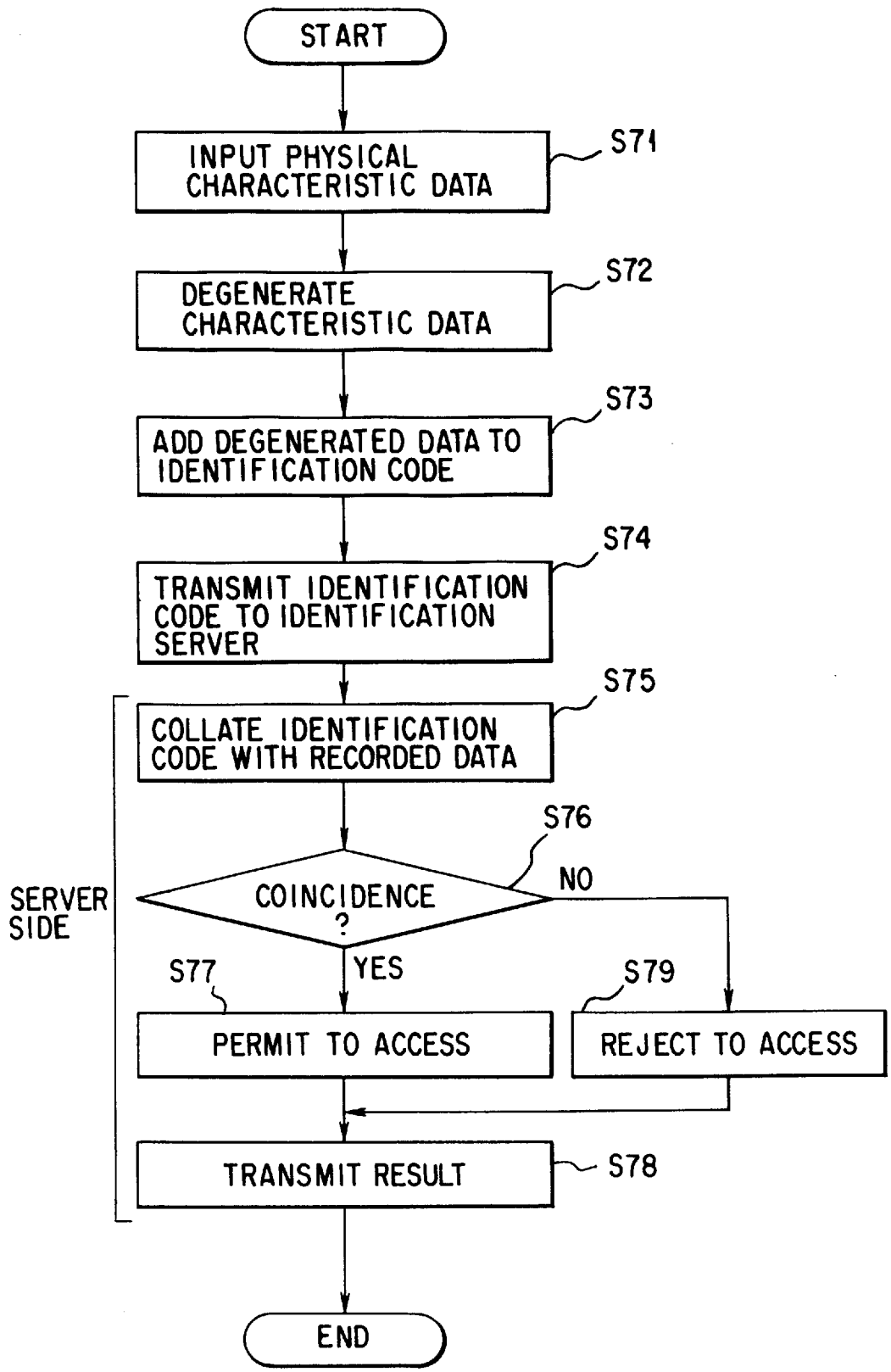
F I G. 14

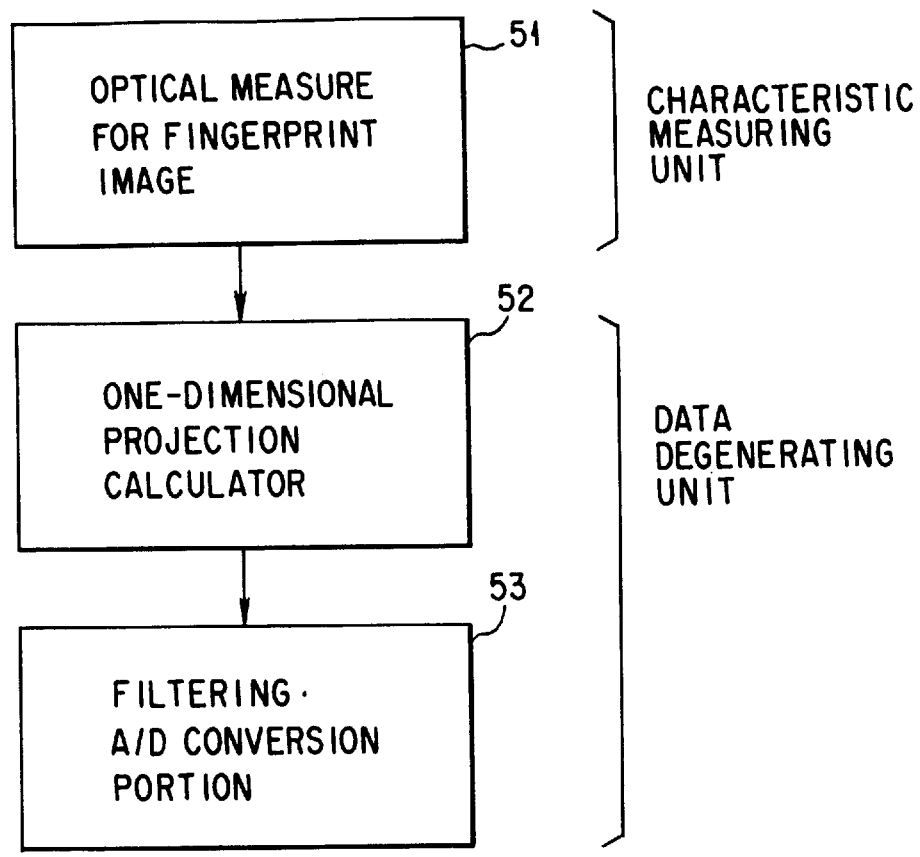
F I G. 15A
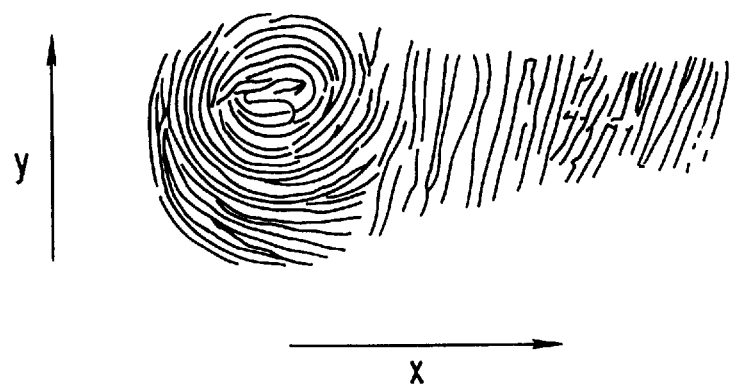
F I G. 15B

1

COMPUTER NETWORK SYSTEM AND PERSONAL IDENTIFICATION SYSTEM ADAPTED FOR USE IN THE SAME

BACKGROUND OF THE INVENTION

1. Field of the Invention

The present invention relates to a computer network system which is constructed by connecting a plurality of computer systems to one another via a communication network, and a personal identification system adapted for use in this computer network system. More particularly, this invention relates to a computer network system which executes security processing using physical characteristic data and a personal identification system adapted for use in this computer network system.

2. Description of the Related Art

For the security protection, a computer network system, which has a plurality of computer terminals (systems) mutually connected via a communication network, should perform a process of identifying each user to discriminate if the user has the proper access right, i.e., an access right determining process, in response to the user's request to access to the network system. The most typical way to identify a user is to input a password as a user identification (ID) code from a keyboard of a computer terminal. Because the determination of a user ID code is based only on the password that is input from a keyboard in this method, anybody who knows the password of any registered user can access the network without the proper authorization. This scheme cannot therefore completely prevent an unauthorized access to the network.

Therefore, passwords are made complex to improve security, and some additional measures are taken such as setting exclusive passwords individually at the time of accessing to one computer system from another in the same network. This method requires that each user should memorize plural types of complicated passwords and needs a very tedious operation of entering passwords, putting great burden on users.

As mentioned above, the conventional method of accessing to a network system or a computer system in a computer network system using passwords cannot accomplish complete security protection and inevitably involves a tiresome operation by each user.

SUMMARY OF THE INVENTION

Accordingly, it is a primary object of the present invention to provide a computer network system which can execute a process of determining an access right at a high speed in accordance with a user's access request, by using physical characteristic data, while maintaining a high degree of securely protection.

It is a secondary object of this invention to provide a personal identification system for use in a computer network system, which can execute a sure identification process with an easy operation, thus relieving users of burden.

According to one aspect of this invention, there is provided a network system comprising a plurality of data processing means; and communication means for mutually connecting the plurality of data processing means, each of the plurality of data processing means including measuring means for measuring physical characteristic of a user, generation means for degenerating the measured physical characteristic to generate characteristic data, and data transmitting and receiving means for transmitting and receiving the characteristic data as a user identification code via the communication means. This network system may further comprise identification means, connected to the communication means, for verifying a user identification code, received via the communication means, with a preregistered user identification code to determine whether or not to permit an access request.

According to another aspect of this invention, there is provided an access management method for a network system comprising a plurality of data processing means, and communication means for mutually connecting the plurality of data processing means, which method comprises the steps of measuring physical characteristic of a user in accordance with an access request; degenerating the measured physical characteristic to generate characteristic data; and transmitting and receiving the characteristic data as a user identification code via the communication means. This access management method may further comprise the steps of verifying the user identification code, transmitted and received via the communication means, with a preregistered user identification code; and determining whether or not to permit an access request in accordance with an identification result of the verifying step.

Characteristic data, which is acquired by extracting the physical characteristic of a human being such as the characteristic of a finger, depends on a fingerprint specific to each person. If this characteristic data is used as a user ID code to determine whether or not to accept an access request to a network system, an access by an unauthorized person whose characteristic data is not registered is rejected to provide surer security protection than the system which simply uses passwords. Moreover, this method does not require a tedious input operation, thus relieving users of burden in performing an access operation.

As the characteristic data used in this system is degenerated data whose amount is approximately one tenth of the amount of data needed in an ordinary system which uses a fingerprint image, data transfer via a communication network and data processing like identification by an identification server on a network can be conducted at a high speed. Likewise, the capacity of a file system needed in the identification is approximately one tenth of the conventionally needed capacity.

In such a computer network system, once an access to the network is permitted, using the characteristic data of a finger as a user ID code at the time of accessing from one computer system to another computer system simplifies tiresome procedures conventionally required to access to another computer system.

The network system according to the first aspect may be a workflow system for transmitting arbitrary data to the plurality of data processing means in a preset order; and each of the plurality of data processing means may include means for enabling determination of permission or rejection in accordance with reception of the data only when the user identification code coincides with a preregistered user identification code.

In a workflow system which manages the flow of a sequence of works set on a computer network system, a determination process to determine identification or non-identification based on preset conditions can be executed only when preregistered characteristic data of a finger coincides with finger characteristic data entered at the time of making the determination. This can ensure an easier operation and surer electronic identification.

The aforementioned measuring section and generation section extract the characteristic of a finger from the distribution of the resistances between adjoining electrodes of the linear electrode array, acquired by the finger of the user contacting the linear electrode array in the array direction, and output one-dimensional extracted characteristic data along the longitudinal direction of the finger. The amount of the characteristic data is significantly smaller than that provided by a fingerprint sensor which detects a fingerprint as a two-dimensional image, so that data transfer via a communication network and identification of the characteristic data with registered characteristic data on a computer network system can be executed at a high speed. It is therefore possible to ensure faster personal identification.

According to the third aspect of this invention, there is provided a personal identification system in a network system having a plurality of data processing apparatuses mutually connected, which system comprises characteristic extraction means for outputting characteristic data based on a distribution of resistances of adjoining electrodes of a linear electrode array, arranged one-dimensionally on a substrate, acquired when a finger of a person to be verified contacts the linear electrode array in an array direction; positioning means for positioning the characteristic data output from characteristic extraction means with preregistered characteristic data; difference calculating means for calculating a difference between the characteristic data and the preregistered characteristic data, positioned by the positioning means; and determining means for comparing the difference calculated by the difference calculating means with a preset value to determine identification of the person to be verified.

With this structure, the amount of the characteristic data is significantly smaller than that provided by a fingerprint sensor which detects a fingerprint as a two-dimensional image. Therefore, data transfer via a communication network and identification of the characteristic data with registered characteristic data on a computer network system can be executed at a high speed to thereby ensure faster personal identification. It is also possible to accurately perform the identification of extracted characteristic data with registered characteristic data by performing the positioning process, even if the relative position of the finger of a person to be verified to the linear electrode array slightly differs from the relative position at the recording time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 7A and 7B are flowcharts for comparing a conventional optical method for extracting characteristic data and an electrode-array oriented method according to the first embodiment;

FIG. 8 is a diagram showing a modification of the computer network system according to the first embodiment;

FIG. 9 is a flowchart for explaining a workflow process according to the second embodiment of this invention;

FIG. 11 is a flowchart illustrating the processing by a computer system which has requested a file access in the computer network system shown in FIG. 10;

FIG. 12 is a flowchart illustrating the processing by a computer system to which a file access has been made from another computer system in the computer network system shown in FIG. 10;

FIG. 13 is a block diagram showing the schematic structure of a computer network system according to the fourth embodiment of this invention;

FIG. 14 is a flowchart illustrating the processes by a computer system and an identification server in the computer network system shown in FIG. 13; and FIGS. 15A and 15B are diagrams for explaining the characteristic measuring unit and data degenerating unit which are applied a one-dimensional projection detection apparatus using optical method.

DETAILED DESCRIPTION OF THE PREFERRED EMBODIMENTS

The first to fourth embodiments of the present invention will now be described with reference to the accompanying drawings.

Figure 1:
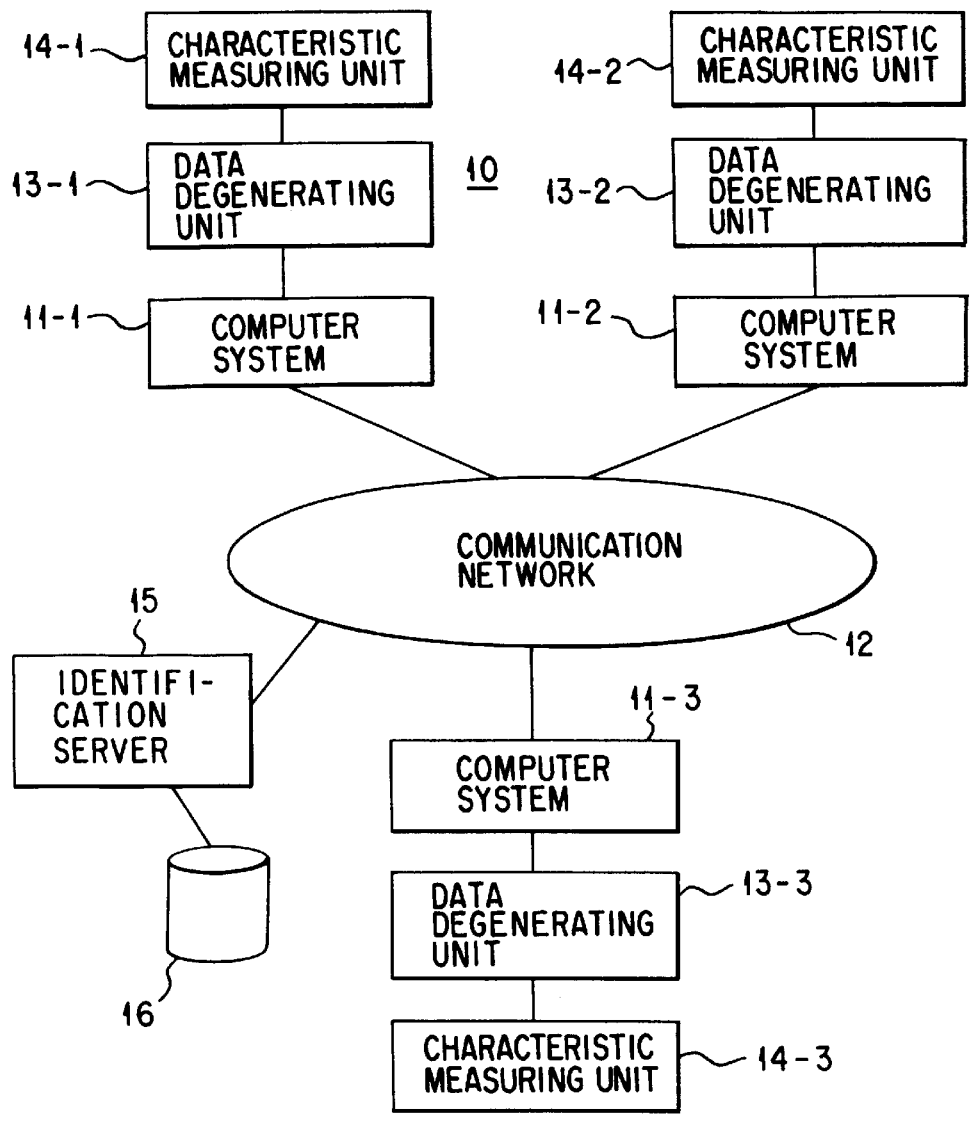
FIG. 1 is a block diagram showing the schematic structure of a computer network system according to the first embodiment of this invention.

FIG. 1 presents a block diagram illustrating the schematic structure of a computer network system according to the first embodiment of this invention. A plurality of computer systems 11 (11-1 to 11-3) are mutually connected via a communication network 12. Characteristic measuring units 14 (14-1 to 14-3) which measure the physical characteristic (characteristic data) of a user are respectively connected to the individual computer systems 11 via associated data degenerating units 13 (13-1 to 13-3). The physical characteristic of a user are extracted as an electric signal by the data degenerating units 13 and characteristic measuring units 14. In this embodiment, as will be discussed later, each characteristic measuring unit 14 measures fingerprint information of a finger of the user as the physical characteristic of the user. The "physical characteristic" means information about a human body and a characteristic specific to each individual. Although the computer network system shown in FIG. 1 has three computer systems 11 mutually connected, the number of the computer systems to be connected is not limited to this number.

Further connected to the communication network 12 is an identification (authentication) server 15 which discriminates if an access request by a user to the computer network system should be permitted based on the characteristic data measured by the individual characteristic measuring units 14. This identification server 15 identify the degenerated characteristic data, sent via the communication network 12 from the computer system 11, (hereinafter called "extracted characteristic data") with preregistered characteristic data of a finger (hereinafter called "registered characteristic data") in this computer network system to determine if a user or a person to be verified has an access right. The characteristic data is held in a file system 16 in this embodiment.

Figure 2A:
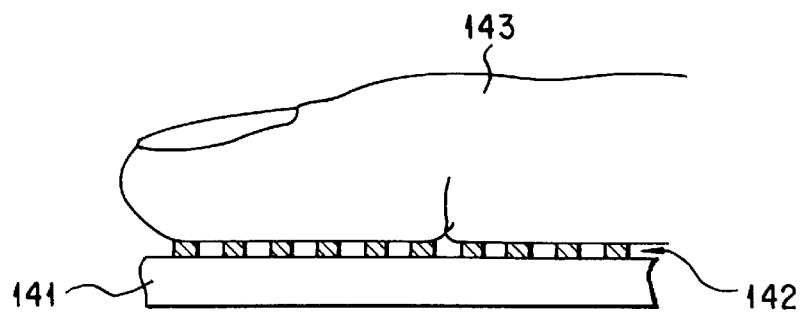
FIGS. 2A and 2B schematically show the structure of a characteristic measuring unit and a data degenerating unit shown in FIG. 1.
Figure 2B:
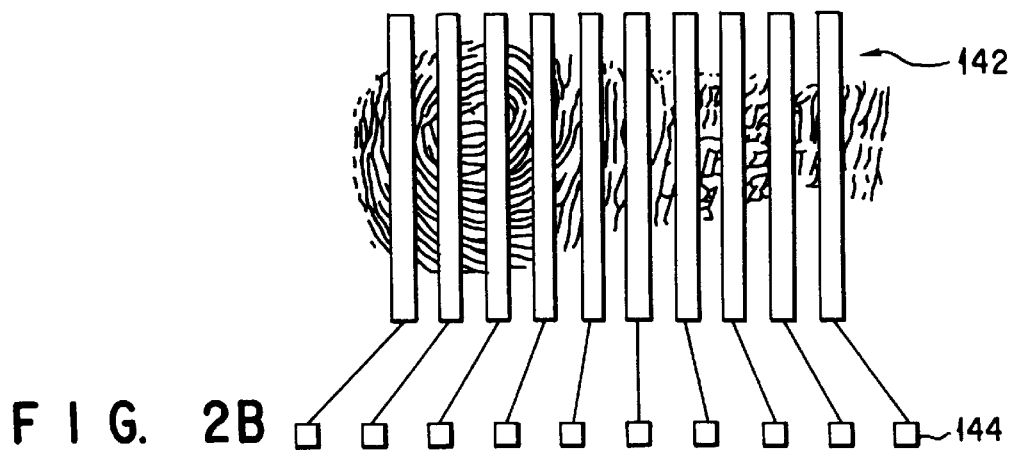
Figure 3:
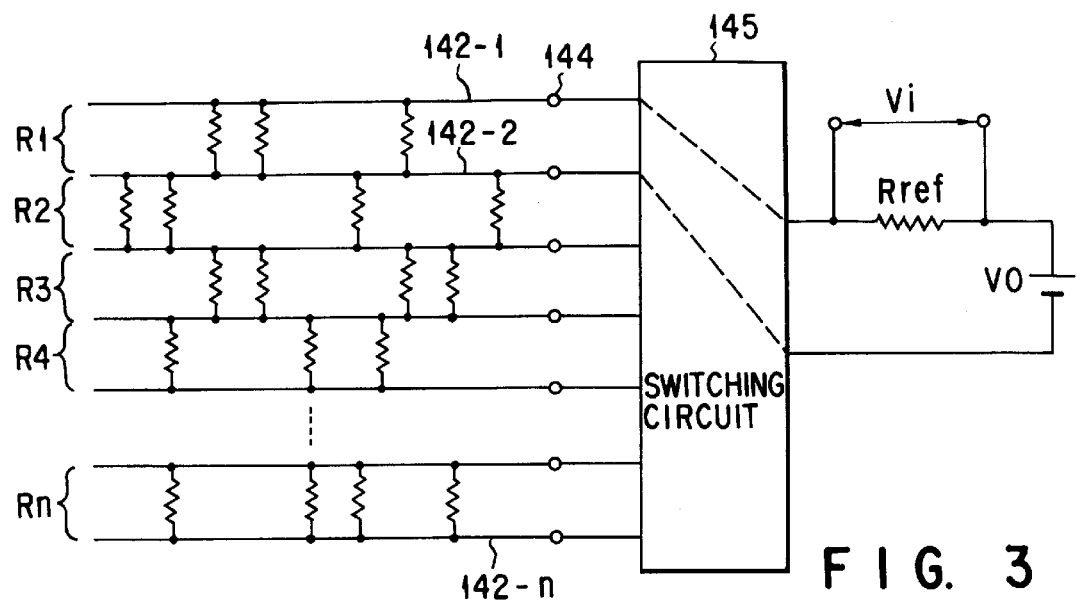
FIG. 3 is a diagram showing an equivalent circuit of the characteristic measuring unit and the data degenerating unit in FIG. 1.

With reference to FIGS. 2A to 4, a description will now be given of how to extract and degenerate the physical characteristic by means of the data degenerating unit 13 and characteristic measuring unit 14 shown in FIG. 1. Note that, when an electrode-array oriented method applies to the first embodiment, the data generating unit 13 and the characteristic measuring unit 14 are achieved by incorporating these units in one apparatus as shown in FIGS. 2A, 2B and 3. As mentioned above, the characteristic measuring unit 14 measures the fingerprint information of a finger of a user to be identified. The data degenerating unit 13 calculates the fingerprint information, measured by the characteristic measuring unit 14, as extracted characteristic data in the form of an electric signal. At this time, the data degenerating unit 13 performs processes, such as filtering and analog/digital conversion. The extracted characteristic data acquired by this data degenerating unit 13 is degenerated data like a one-dimensional projection which includes less information than data indicative of, for example, the surface image of a finger.

A description will now be given of degenerated data. Generally speaking, data obtained by measuring the physical characteristics, such as a fingerprint image, a facial image, a voice and the retina, includes a plurality of characteristics. For example, a two-dimensional image is made of a plurality of one-dimensional images. "Degeneration" or a "degenerating process" is a process using an arithmetic operation to thereby reduce the amount of information in the overall data, and "degenerated data" indicates data which has undergone such processing. This arithmetic operation corresponds to data processing and calculations performed by an exclusive circuit, or measurement carried out by a special device (an electrode array, an optical arithmetic operation unit or the like). In this respect, filtering can be considered as a data degenerating process.

Data degenerating processes include one-dimensional projection (two-dimensional projection in the case of a three-dimensional image), the extraction of a contour line, the extraction of a vector (vector motion), Fourier transform, characteristic extraction and smoothing.

One example of the structure of an apparatus including the data degenerating unit 13 and the characteristic measuring unit 14 is illustrated in FIGS. 2A and 2B. FIG. 2A presents a side view of the case showing a finger to be identified being placed on the apparatus, and FIG. 2B shows the positional relationship between linear electrodes, which will be discussed later, and the fingerprint of the finger to be identified. A linear electrode array 142 is formed on the surface of an insulative substrate 141. This linear electrode array 142 has a plurality of linear electrodes arranged in a one-dimensional array. The possible materials for the substrate 141 include a printed substrate of glass epoxy or the like, a ceramic plate and a thin metal plate coated with an insulating film. The electrodes of the linear electrode array 142 is made of a conductive material, such as a thin Cu film, a thin Au film, an Ni plated film, a thin Pt film or a thin Pd film, which is not likely to be corroded by body fluid like sweat that comes out of the human skin. As the object to be measured has a relatively high resistance, any material other than an insulator may be used for the electrodes; for example, an oxide film of ITO (indium tin oxide) or the like may be used as well. No particular restriction is made on the method of forming the electrodes, and normal methods such as plating and deposition can be used as well.

As a finger of a user contacts the linear electrode array 142, the pitches of the electrodes are set to approximately 0.1 mm, which is smaller than the undulation pitch (about 0.5 mm) which constitutes a fingerprint. The length of the linear electrode array 142 in the array direction (array length) should be set long enough to completely cover the distance from the distal end of a finger to the second joint. As the pitches between the electrodes are constant, the array length can be adjusted by the number of electrodes. Lead-out terminals 144 are connected to the individual electrodes constituting the linear electrode array 142. At the time of measuring the physical characteristic, a finger 143 is to be pressed against the linear electrode array 142 along the array direction thereof and in a direction perpendicular to the longitudinal direction of the individual electrodes, as shown in FIGS. 2A and 2B.

FIG. 3 shows an equivalent circuit of the data degenerating unit and the characteristic measuring unit 14. The data degenerating unit 13, which has a switching circuit 145 connected to the lead-out terminals 144, a reference resistor Rref and a low-constant-voltage power supply Vo, sequentially reads the resistances between the adjoining electrodes in the longitudinal direction of a finger when the finger is pressed against the linear electrode array 142 shown in FIGS. 2A and 2B (n electrodes 142-1 to 142-n shown in FIG. 3).

Normally, the surface of a human finger has undulations of the skin according to the arrangement of sweat pores, forming a fingerprint, and sweat always and naturally comes out of the sweat pores. That is, moisture containing a minute amount of Na or Cl always comes out from the undulation portion of the fingerprint. When the finger is pressed on the linear electrode array 142, therefore, water (sweat) escaping from the sweat pores of the fingerprint undulation portion reaches the linear electrodes lying directly below this undulation portion. At this time, the electric resistance between the electrodes where moisture has reached decreases due to ions that depend on moisture. As a result, only the portion corresponding to the fingerprint undulation portion becomes a lower resistance state than the other portions.

Besides the low-resistance state caused by the sweat, the resistance $R_i$ between adjoining two electrodes $142i$ and $142i+1$ ($i=1, 2, \ldots, n$) of the linear electrode array 142, where the finger of the user to be identified is pressed and the protruding portion which forms the fingerprint is placed, changes in accordance with the amount of the protruding portion entering between the electrodes. In other words, the greater the amount of the protruding portion entering between the electrodes becomes, the lower the resistance $R_i$ becomes.

The switching circuit 145 is connected via the lead-out terminals 144 to the electrodes 142-1 to 142-n. The switching circuit 145 may be constituted of an analog switch or more specifically an analog multiplexer IC (Integrated Circuit). The switching circuit 145 connects the adjoining two electrodes $142i$ and $142i+1$ to a constant-voltage power supply Vo via the reference resistor Rref. In FIG. 3, for example, the electrodes 142-1 and 142-2 are connected to the constant-voltage power supply Vo via the reference resistor Rref as indicated by broken lines. The potential difference Vi across the reference resistor Rref is given by the following equation.

$$Vi = Rref \cdot Vo/(Rref+Ri)$$

Figure 4:
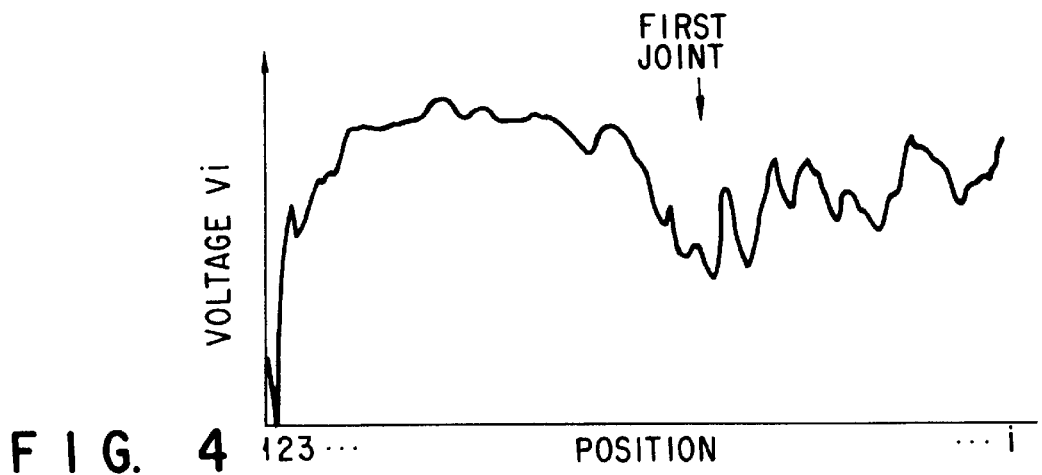
FIG. 4 is a diagram exemplifying the distribution of resistances between adjoining liner electrodes as a characteristic pattern of a finger which is detected and degenerated by the characteristic measuring unit and the data degenerating unit in the first embodiment.

The potential difference Vi is sequentially read in the longitudinal direction of the finger while sequentially switching the combination of adjoining two electrodes from which the potential difference Vi should be detected to 142-1 and 142-2, 142-2 and 142-3, ..., and 142-n-1 and 142-n by means of the switching circuit 145. FIG. 4 shows a plot of the potential differences Vi thus read in the time-sequential manner, and this plot is a pattern equivalent to the one-dimensional projection in the longitudinal direction of the finger. In FIG. 4, the horizontal scale represents the positions of the adjoining two electrodes and the vertical scale represents the potential difference Vi.

A signal acquired by the above-described processing is filtered and is subjected to analog-digital conversion in the data degenerating unit 13. The amount of the output data of the data degenerating unit 13 is approximately 100 bytes for the detection resolution between the electrodes of 8 bits. The signal pattern indicative of this data is A(i).

The amount of the characteristic data acquired here is smaller by about one order than that in the case where an ordinary fingerprint image is used. This embodiment has such a great advantage that data transfer via the communication network 12 and identification in the identification server 15 or the like on the computer network in FIG. 1 can be executed at a high speed. The fingerprint image of a human finger, even subjected to compression, generally amounts to about 1 Kbytes. In this invention, by degenerating the physical characteristic of a human being, the amount of fingerprint information becomes approximately 100 bytes, about one tenth of the amount of the fingerprint image, as mentioned earlier. Likewise, the capacity of the file system 16 needed for the identification becomes about one tenth of the capacity needed conventionally.

Figure 5:
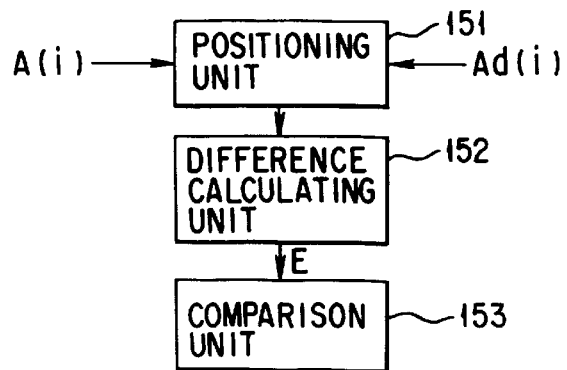
FIG. 5 is a block diagram depicting the structure of an identification server shown in FIG. 1.

The identification server 15 will now be discussed. FIG. 5 is a functional block diagram illustrating the structure of the identification server 15. The identification server 15 comprises a positioning unit 151, a difference calculating unit 152 and a comparison unit 153.

The positioning unit 151 positions the signal pattern A(i) indicative of the extracted characteristic data, extracted by the characteristic measuring unit 14 and the data degenerating unit 13, with a registered signal pattern Ad(i) indicative of registered characteristic data read from the file system 16.

The registered characteristic data stored in the file system 16 is the characteristic data which has been acquired by the characteristic measuring unit 14 when a finger was placed in a given stage on the linear electrode array 142. When characteristic measurement is performed for identification or extracted characteristic data is to be acquired, the state of a user's finger on the characteristic measuring unit 14 should not necessarily be the same as the one when the registered characteristic data was obtained. That is, it is well expected that the mounting position of a finger varies slightly. In this respect, the positioning unit 151 executes a positioning process so that the extracted characteristic data becomes data obtained with the finger placed at the same position as the time when the registered characteristic data was acquired. This processing can ensure more accurate identification. A specific way to do the positioning will be discussed later. The difference calculating unit 152 computes the difference between the extracted characteristic data and registered characteristic data from the output signal of the positioning unit 151. Of course, the smaller this difference becomes, the greater the possibility that the person to be verified whose characteristic has been extracted by the characteristic measuring unit 14 and the data degenerating unit 13 is the true user himself or herself previously registered in the file system 16. The comparison unit 153 compares the difference acquired by the difference calculating unit 152 with a given threshold value or slice level TH to determine if the person to be verified is the registered user or the true user having an access authorization.

According to the thus described structure of the first embodiment, a user, who tries to access to the computer network system 10 via any computer system 11, first enters the physical characteristics of a finger via the characteristic measuring unit 14 connected to that computer system 11. The extracted characteristic data obtained by the characteristic measuring unit 14 and data degenerating unit 13 is transferred via the communication network 12 to the identification server 15 whose structure is illustrated in FIG. 5. This identification server 15 verifies the extracted characteristic data with registered characteristic data previously registered in the file system 16. Based on the result of this identification, it is determined if the user has the access right.

Figure 6:
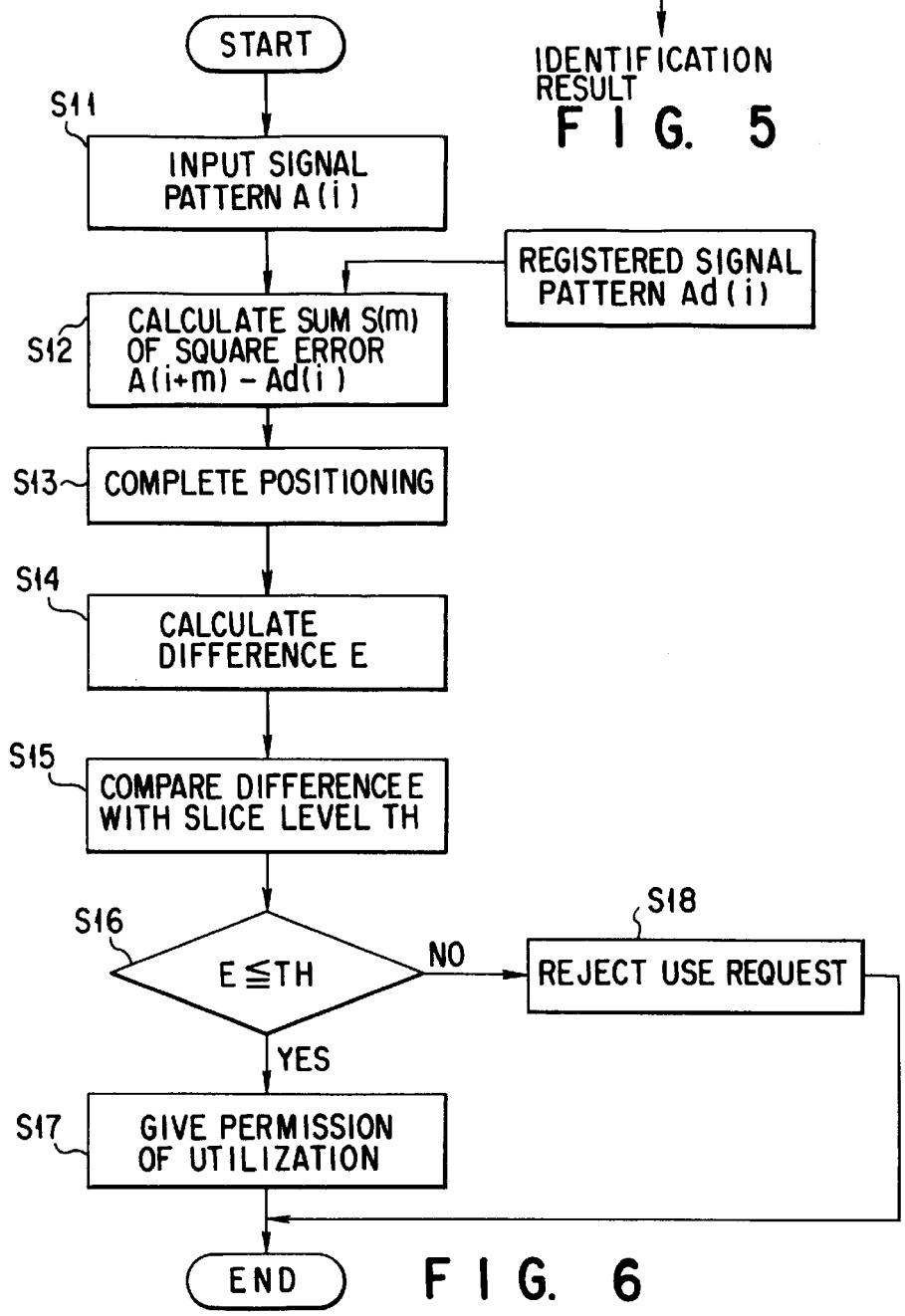
FIG. 6 is a flowchart for explaining the operation of the identification server in FIG. 5.

The identification process by the identification server 15 is executed in accordance with the flowchart illustrated in FIG. 6. First, the positioning unit 151 performs the following positioning process. The signal pattern A(i) which is the extracted characteristic data sent from the characteristic data 11 making the access request is input (step S11). Then, this signal pattern A(i) and the registered signal pattern Ad(i), which is the registered characteristic data read from the file system 16 by the identification server 15, are used to accumulate the square error between a signal pattern A(i+m), which is A(i) shifted by m, and the registered signal pattern Ad(i) over a predetermined range (step S12). The resultant sum, S(m), is given by either one of the following equations (1) and (2) depending on the range of the value of m. m≧0 is equivalent to a finger shifted toward, for example, the finger tip, and m<0 is equivalent to a finger shifted in the opposite direction or toward the base.

When m≧0, $$S(m) = \frac{1}{N-m} \sum_{i=1}^{N-m} \{A(i+m) - Ad(i)\}^2 \quad (1)$$

When m<0, $$S(m) = \frac{1}{N+m} \sum_{i=M+1}^{N} \{A(i+m) - Ad(i)\}^2 \quad (2)$$

This sum S(m) is a parameter representing the degree of coincidence between A(i+m) and Ad(i), which is higher as the value of S(m) becomes smaller. It is determined that positioning is possible with the pattern A(i+M), which is the pattern A(i) shifted by the positional offset M that is the particular m within a predetermined range, which minimizes the value of S(m) (step S13).

Then, the difference calculating unit 152 calculates the difference E from the following equations (3) and (4) (step S14).

When M≧0, $$E = \sum_{i=1}^{N-M} \{A(i+M) - Ad(i)\}^2 / \sum_{i=1}^{N-M} Ad(i)^2 \quad (3)$$

When M<0, $$E = \sum_{i=M+1}^{N} \{A(i+M) - Ad(i)\}^2 / \sum_{i=M+1}^{N} Ad(i)^2 \qquad (4)$$

The difference E acquired by those equations indicates a value obtained by normalizing the sum of the square errors between the positioned input signal pattern A(i+M) and registered signal pattern Ad(i) over a predetermined range, by the square sum of the registered signal pattern Ad(i) over the same range. This difference E represents the difference between the positioned input signal pattern A(i+M) and registered signal pattern Ad(i), and indicates that the difference between both signals becomes larger as the value of E gets larger while both signals are similar as the value of E becomes smaller.

The comparison unit 153 compares the difference E with the predetermined slice level TH (steps S15 and S16). When E≦TH, both signals match with each other in which case the user to be verified is considered as the registered user himself or herself, and the identification process is terminated (step S17). When E>TH, it is determined both signals do not match with each other in which case the user to be verified is considered as different from the registered user himself or herself, and the identification process is terminated (step S18).

When the person to be verified is determined as the true user in the step S17, the identification server 15 gives access permission. Even in the case where the access conditions on the whole network have been set and one computer system in the network requests an access to another computer system (service), the identification server 15 can perform the identification and determination processes by using the characteristic data, extracted in the above-described manner, as a user ID code.

According to the first embodiment, as described above, characteristic data, which is acquired by extracting the physical characteristic of a human being (fingerprint of a finger in this embodiment), as a user ID code, is verified with preregistered characteristic data to determine if there is a right to access to the network system. Accordingly, an access by an unauthorized person whose characteristic data is not registered is rejected to provide surer security protection than the system which simply uses passwords. Moreover, this method requires a simple operation by the user of pressing a finger on the linear electrode array as has been described above to extract the characteristic data, and does not require a tedious input operation, like inputting a password, thus relieving users of the burden of performing an access operation.

As the characteristic data used in the first embodiment is degenerated data whose amount is approximately one tenth of the amount of data needed in an ordinary system which uses a fingerprint image, data transfer via the communication network 12 and data processing like identification by the identification server 15 on the computer network in FIG. 1 can be conducted at a high speed. Likewise, the capacity of the file system 16 needed in the identification is approximately one tenth of the conventionally needed capacity.

The extraction of the characteristic data needs various kinds of processes as illustrated in FIG. 7A in the conventional optical method. First, a finger image as two-dimensional information is acquired by an optical sensor, pixel information of the acquired finger image across the finger are accumulated (steps S21 and S22). Then, the high-frequency component and low-frequency component are cut from the accumulated information by a band-pass filter and resultant data is output as characteristic data (steps S23 and S24).

Figure 7B:
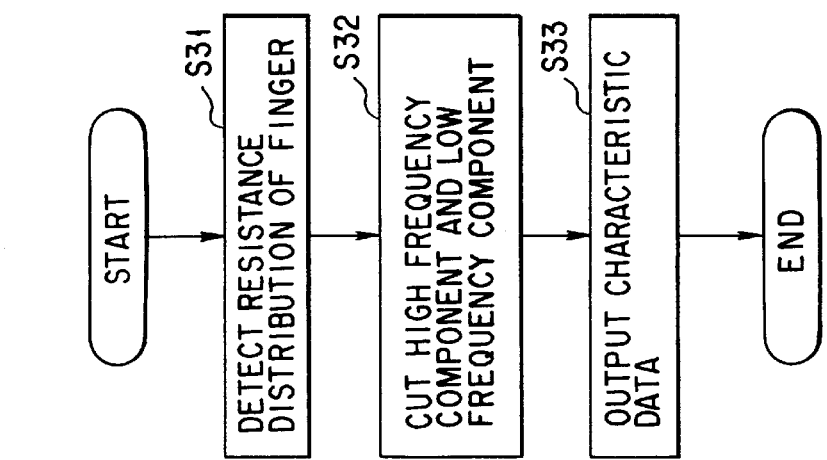

According to the above-described method using the linear electrode array as shown in FIG. 7B, after the detection of the distribution of the resistances of a finger (step S31) and the removal of the high-frequency component and low-frequency component (step S32), characteristic data is output (step S33). The outputting of the characteristic data is accomplished by fewer processes than those of the conventional optical method. This approach can ensure quicker extraction of characteristic data by the data degenerating unit 13 and characteristic measuring unit 14 connected to each associated computer system 11.

Although one-dimensional projection of a fingerprint is used as degenerated characteristic data indicating the physical characteristic of a human being, the contour of a finger or fingerprint information acquired by Fourier transform may be used as well.

Once an access to the network is permitted, using the characteristic data of a finger as a user ID code at the time of accessing from one computer system to another computer system simplifies tiresome procedures, such as inputting plural types of passwords, conventionally required to access to another computer system.

The above-described electrode array system has the characteristic measuring unit and data degenerating unit designed as an integrated unit. Instead of the electrode array, an optical device for detecting one-dimensional projection may be employed. In this case, the characteristic measuring unit and data degenerating unit may be constituted as different units, as shown in FIG. 15A. As illustrated in this diagram, the characteristic measuring unit is constituted of an optical fingerprint measuring unit, while the data degenerating unit is comprised of a one-dimensional projection calculating unit and a filtering and A/D conversion unit. The optical fingerprint measuring unit measures a two-dimensional fingerprint image as shown in FIG. 15B and sends the measured image information to the one-dimensional projection calculating unit. The one-dimensional projection calculating unit performs some computation to convert the two-dimensional image information to one-dimensional information, and also performs filtering or A/D conversion to output degenerated data including the extracted characteristic.

Although the computer system 11 is connected to the characteristic measuring unit 14 via the data degenerating unit 13 in the first embodiment, the data degenerating unit 13 and characteristic measuring unit 14 may be incorporated in the computer system 11. For example, a characteristic measuring section having the same performance as the characteristic measuring unit 14 may be provided on the keyboard of the computer system 11. If the data degenerating unit 13 and characteristic measuring unit 14 are incorporated as a characteristic (finger feature) extracting section in the computer system 11, the computer network system would have a structure as shown in FIG. 8.

A plurality of computer systems 21 (21-1 to 21-3) are mutually connected via a communication network 22, as per the above-described first embodiment. Each computer system 21 incorporates a finger feature extraction unit 27 (27-1, 27-2, 27-3) for extracting the physical characteristic (finger feature data) of a user. The finger feature extraction unit 27 has the same functions as the above-described characteristic measuring unit 14 and data degenerating unit 13, and extracted finger feature data is degenerated data. Further connected to the communication network 22 is an identification server 25 which discriminates if an access request by a user to the computer network system should be permitted based on the characteristic data measured by the individual characteristic measuring units 24.

The operation of a computer network system 20 shown in FIG. 8 is the same as the above-described operation of the first embodiment, its detailed description will not be repeated. This computer network system 20 can also have the same advantages as the first embodiment.

A computer network system according to the second embodiment of this invention will be described below. In the second embodiment, this invention is adapted to a workflow system.

FIG. 9 is a flowchart illustrating the processes of a workflow according to the second embodiment. The computer network system according to the second embodiment has the same structure as that of the first embodiment shown in FIG. 1. This computer network system is a workflow system which manages the sequence of tasks set on a work system and in which the data degenerating unit 13 and characteristic measuring unit 14 for extracting the physical characteristic are connected to the computer system 11 and characteristic data (e.g., fingerprint information of a finger) of a person having an authorization and processing conditions are registered in the file system 16 of the identification server 15.

A specific flow will now be explained referring to FIG. 9. In this example, fingerprint information of a human finger is used as characteristic data (finger feature data) as per the above-described embodiment. When an authorization request is made in the set sequence of tasks, the computer system whose user has been asked to check the authorization receives the authorization request via the communication network 12 (step S41). The authorizing person displays the received authorization request on the terminal and inputs the finger feature data via the characteristic measuring unit 14 (step S42). The extracted feature data is sent to the identification server 15 via the communication network 12. The identification server 15 performs the identification process which has been described referring to FIG. 6. When the feature data preregistered in the file system 16 as that of a person having the authorization matches with the transferred extracted feature data, the permission and rejection procedures can be executed so that permission is granted to the computer system 11 (step S43). After the execution of the authorization procedures, processed data is sent to the computer system 11 which is associated with the next processing via the communication network 12 (steps S44 and S45).

Although the foregoing description has been given of the authorization procedures, this invention may also be adapted to another processing like calculation or addition of a document if one wants to specify who is performing the process.

If this invention is adapted to a workflow system which manages the sequence of tasks set on the computer network system, a determination process to determine identification or non-identification based on preset conditions can be executed only when preregistered feature data of a finger coincides with finger feature data entered at the time of making the determination. This can ensure surer electronic identification with an easier operation.

The aforementioned measuring section and generation section extract the finger feature data from the distribution of the resistances between adjoining electrodes of the linear electrode array, acquired by the finger of the user contacting the linear electrode array in the array direction, and output one-dimensional extracted feature data along the longitudinal direction of the finger. The amount of the feature data is significantly smaller than that provided by a fingerprint sensor which detects a fingerprint as a two-dimensional image, so that data transfer via a communication network and identification of the feature data with registered feature data on a computer network system can be executed at a high speed. It is therefore possible to ensure faster personal identification.

A computer network system according to the third embodiment of this invention will now be described with reference to FIGS. 10 to 12.

Figure 10:
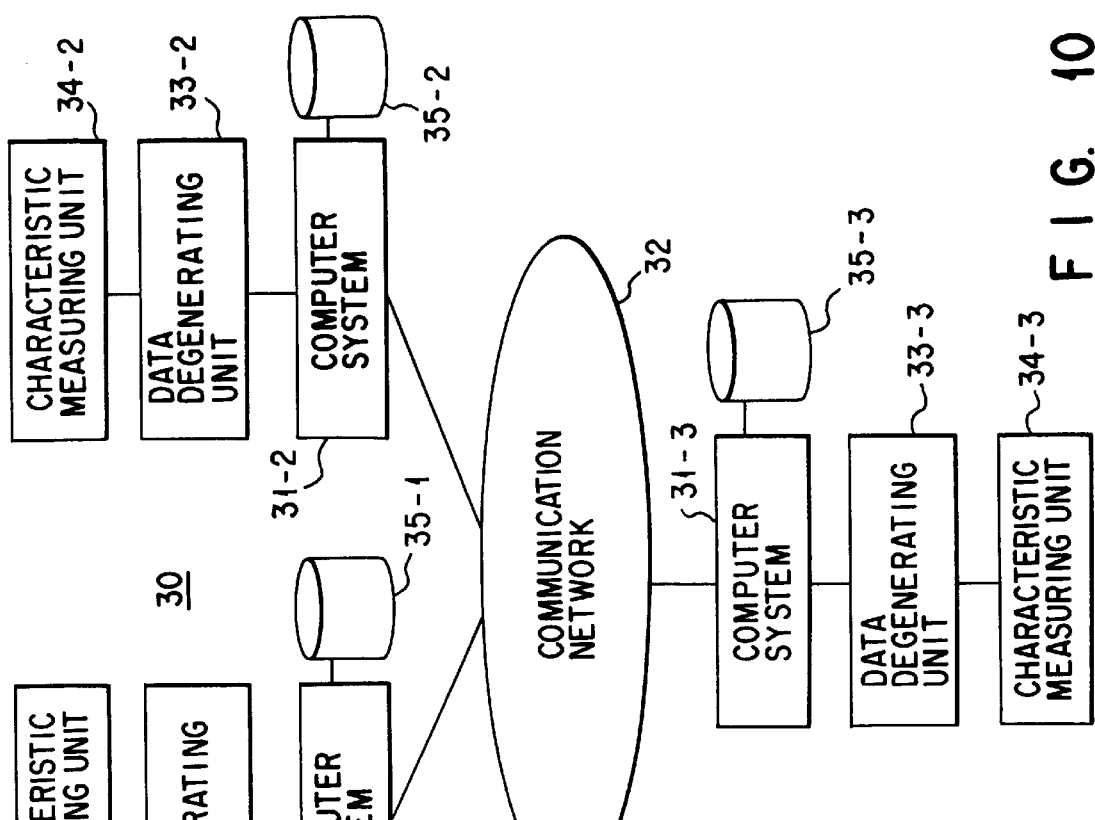
FIG. 10 is a block diagram showing the schematic structure of a computer network system according to the third embodiment of this invention.

A computer network system 30 shown in FIG. 10 has a plurality of computer systems 31 (31-1 to 31-3) mutually connected via a communication network 32. Characteristic measuring units 34 (34-1 to 34-3) which measure the physical characteristic (characteristic data) of a user are respectively connected to the individual computer systems 31 via associated data degenerating units 33 (33-1 to 33-3). The physical characteristic of a user are extracted as an electric signal by the data degenerating units 33 and characteristic measuring units 34. In this embodiment, although the physical characteristic to be extracted is not particularly limited, the fingerprint information (one-dimensional projection) of a user's finger may be measured as per the first embodiment, or characteristic data degenerated by Fourier transform or the extraction of the contour line may also be used. The number of computer systems to be connected is not limited to the above-specified number as in the first embodiment.

This computer network system differs from the one shown in FIG. 1 in that the identification server 15 for performing the identification of the physical characteristic, and the file system 16 for storing the registered characteristic data to be referred to by the identification server 15 are not provided.

The second difference lies in that file systems 35 (35-1 to 35-3) are connected to the respective computer systems 31 connected to the communication network 32. This file system 35 stores registered characteristic data, which is to be referred to in the identification to determine the access authorization, and various kinds of files and data to be processed. According to the third embodiment, therefore, each computer system 31 first performs the identification to determine the access authorization in accordance with the extraction of characteristic data.

The file access operation of the computer network system 30 according to the third embodiment will now be discussed referring to the flowcharts illustrated in FIGS. 11 and 12.

When a request to access a file is made in any computer system 31 in the computer network system 30, this computer system 31 is asked to input the physical characteristic, like the fingerprint of a user's finger, using the characteristic measuring unit 34. When the user's finger is placed on the characteristic measuring unit 34, degenerated characteristic data is extracted by the characteristic measuring unit 34 and data degenerating unit 33 in the same way as done in the first embodiment (steps S51 and S52). The extracted characteristic data is affixed to the date at which the access request has been made and a user ID code like a password (step S53). It is to be noted that degenerated extracted characteristic data alone, without being affixed to the date or ID code like a password, may be used.

Then, the computer system 31 determines if the access-requested file is stored in the file system 35 connected to this computer system 31 (step S54). When the access-requested file is stored in the file system 35, registered characteristic data stored in the file system 35 is verified with the extracted characteristic data and user ID code (step S56). The identification processing may be the same as the one performed in the first embodiment. When the result of the identification is a coincidence, the user is permitted to make the file access (step S57). When there is no match, the file access being disabled is reported and the process associated with the file access request is terminated.

When the access-requested file is not stored in the file system 35 in the step S54, the computer system 31 sends the extracted characteristic data and user ID code together with the name of the access-requested file or the like to another computer system via the communication network 32 (step S58). Upon reception of an acknowledgment from the destination computer system, the computer system 31 executes the above-described processing in accordance with the access permission or rejection (step S59). When the access is enabled, which will be discussed later, the access-requested file is sent so that a process of storing the file in the file system 35 is performed.

The processing of the computer system 31 which has received various kinds of data sent in the step S58 will be described below with reference to FIG. 12.

When receiving the extracted characteristic data and user ID code together with the name of the access-requested file or the like from another computer system, the computer system 31 determines if the access-requested file is stored in the file system 35 connected to the local computer system 31 (steps S61 and S62). When the access-requested file is not stored in the file system 35, such is reported to the requesting computer system (step S63).

When the access-requested file is stored in the file system 35 in the step S62, the identification process for determining if the requesting user has a file access authorization using the extracted characteristic data and user ID code received in step S61 (steps S64 and S65). When the identification result is a match, the requesting computer system is informed of having an access authorization and the access-requested file is sent to this computer system (step S66). When the identification result is not a match, the requesting computer system is informed of having no access authorization (step S67).

According to the third embodiment, as described above, characteristic data, which is acquired by extracting the physical characteristic of a human being (fingerprint of a finger in this embodiment), as a user ID code, is verified with preregistered characteristic data to determine if there is a right to access to the network system. Accordingly, an access by an unauthorized person whose characteristic data is not registered is rejected to provide surer security protection than the system which simply uses passwords. According to the third embodiment, particularly, each computer system connected to the communication network 32 first independently performs the process of determining of the access authorization in accordance with a file access request, and only when the access-requested file is not stored in the local file system, the process of determining of the access authorization is performed in another computer system via the communication network 32. It is therefore unnecessary to exchange data via the communication network 32 every time the process of determining of the access authorization is executed.

As the characteristic data used in the third embodiment, like in the first embodiment, is degenerated data whose amount is reduced as compared with the ordinary system which uses a fingerprint image. Therefore, data transfer and data processing can be conducted at a high speed.

A computer network system according to the fourth embodiment of this invention will now be described with reference to FIGS. 13 and 14.

As a computer network system 40 shown in FIG. 13 is basically the same as the computer network system 10 shown in FIG. 1, its detailed description will not be given below. In this computer network system 40, like the one in the third embodiment, file systems 47 (47-1 to 47-3) are respectively connected to computer systems 41 connected to a communication network 42. This file system 47 stores only various kinds of files and data to be processed. According to the fourth embodiment like the first embodiment, therefore, extracted characteristic data is sent to an identification server 45 in accordance with the extraction of characteristic data. This identification server 45 performs the identification process to determine an access authorization.

The flowchart in FIG. 14 illustrates the processes of the computer system 41 and identification server 45 in the computer network system 40 in accordance with a file access.

When a file access request is made by any computer system 41 in the computer network system 40, this computer system 41 is requested to input the physical characteristic, like the fingerprint of a user's finger, using the characteristic measuring unit 44. When the user's finger is placed on the characteristic measuring unit 44, degenerated characteristic data is extracted by the characteristic measuring unit 44 and data degenerating unit 43 in the same way as done in the first embodiment (steps S71 and S72). The extracted characteristic data is affixed to the date at which the access request has been made and a user ID code like a password and the resultant data is then transferred via the communication network 42 to the identification server 45 (steps S73 and S74). It is to be noted that degenerated extracted characteristic data alone, without being affixed to the date or ID code like a password, may be used.

When receiving the extracted characteristic data and user ID code, the identification server 45 performs the identification process to determine if the registered characteristic data stored in the file system 45 coincides with the extracted characteristic data and user ID code (steps S75 and S76). The identification processing may be the same as the one performed in the first embodiment. When the result of the identification is a match, the user is permitted to make the file access and is informed of such (steps S77 and S78). When there is no match, it is determined that the user has no file access authorization and the user is informed of such (steps S79 and S78).

The above-described fourth embodiment can have the same advantages as the first embodiment. Characteristic data, which is acquired by extracting the physical characteristic of a human being, so that as this characteristic data is used as a user ID code to determine whether or not to accept an access request to a network system, an access by an unauthorized person whose characteristic data is not registered is rejected to provide surer security protection than the system which simply uses passwords. Moreover, because the characteristic data to be used is degenerated data, the amount of the data can be reduced considerably as compared with the amount of data needed in the ordinary system which uses a fingerprint image. It is therefore possible to execute data transfer and data process at a high speed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer network system comprising:
   a communications network portion; and
   an access request portion, said access request portion including,
   a fingerprint characteristic measurement unit configured to extract degenerated fingerprint data relative to a user as one-dimensional fingerprint characteristic data along a longitudinal direction of a finger of said user,
   a data combining device for receiving said degenerated fingerprint data and other predetermined user information and forming combined data, and
   a transmitting unit for transmitting the combined data to said communication network.

2. The system according to claim 1, wherein said communication network includes an access request receiving unit configured to receive and process said combined data to provide access to said communication network to an authorized said user.

3. The system according to claim 1, wherein said other predetermined user information includes further data identifying the user.

4. The system according to claim 1, wherein said combined data transmitted by said transmitting unit is received by a verifying unit associated with the communication network, said verifying unit being configured to verify that the degenerated fingerprint data included in said received combined data matches stored one-dimensional projection fingerprint characteristic data to verify that the user has access authority.

5. The system according to claim 4, wherein said verifying unit is a server.

6. The system according to claim 5, wherein said server includes a data entry device configured to enter said one-dimensional projection fingerprint characteristic data into storage.

7. The system according to claim 5, wherein said server is configured to permit access by the user to the communication network if a verification result indicates a match between the stored one-dimensional projection fingerprint characteristic data and the degenerated fingerprint data received as part of the combined data.

8. An access management method for a computer network system having a communication network, said method comprising:
   extracting degenerated fingerprint data relative to a user seeking to use said computer network system by measuring a fingerprint characteristic of said user along a one-dimensional projection;
   combining said extracted degenerated fingerprint data and other predetermined user information to form combined data; and
   transmitting the combined data to said communication network as a computer network system access request by the user.

9. The method according to claim 8, further comprising:
   receiving and processing the transmitted combined data to determine if the user is authorized for computer network system access.

10. The method according to claim 8, wherein the other predetermined user information includes further data identifying the user.

11. The method according to claim 8, further comprising:
    receiving said combined data and separating at least said extracted degenerated fingerprint data therefrom;
    verifying said separated extracted degenerated fingerprint data relative to stored one-dimensional projection fingerprint characteristic data.

12. The method according to claim 11, wherein the receiving and verifying steps are performed by using a server.

13. The method according to claim 12, further comprising:
    entering said one-dimensional projection fingerprint characteristic data into storage using a data input device.

14. The method according to claim 12, further comprising:
    granting the user access to said computer network system when the stored one-dimensional projection fingerprint characteristic data matches the separated extracted degenerated fingerprint data.

* * * * *